United States Patent
Xu et al.

(10) Patent No.: US 12,448,603 B2
(45) Date of Patent: Oct. 21, 2025

(54) STAGED CULTURE METHOD FOR IN-VITRO EXPANSION OF HUMAN CYTOKINE-INDUCED KILLER (CIK) AND USE THEREOF

(71) Applicant: NANJING DRUM TOWER HOSPITAL, Jiangsu (CN)

(72) Inventors: Can Xu, Jiangsu (CN); Dongjin Wang, Jiangsu (CN)

(73) Assignee: NANJING DRUM TOWER HOSPITAL, Jiangsu (CN)

( * ) Notice: Subject to any disclaimer, the term of this patent is extended or adjusted under 35 U.S.C. 154(b) by 0 days.

(21) Appl. No.: 18/873,580

(22) PCT Filed: Aug. 16, 2023

(86) PCT No.: PCT/CN2023/113373
§ 371 (c)(1),
(2) Date: Dec. 10, 2024

(87) PCT Pub. No.: WO2024/103868
PCT Pub. Date: May 23, 2024

(65) Prior Publication Data
US 2025/0163374 A1  May 22, 2025

(30) Foreign Application Priority Data
Nov. 16, 2022 (CN) .......................... 202211432057.X

(51) Int. Cl.
*C12N 5/0783* (2010.01)
(52) U.S. Cl.
CPC .... *C12N 5/0636* (2013.01); *C12N 2501/2302* (2013.01); *C12N 2501/2307* (2013.01); *C12N 2501/2312* (2013.01); *C12N 2501/24* (2013.01); *C12N 2501/51* (2013.01)
(58) Field of Classification Search
CPC ................................................... C12N 5/0636
See application file for complete search history.

(56) References Cited

U.S. PATENT DOCUMENTS

2018/0312606 A1 * 11/2018 Zhou et al.

FOREIGN PATENT DOCUMENTS

| CN | 105695405 A |   | 6/2016 |
|----|-------------|---|--------|
| CN | 105861433 A | * | 8/2016 |
| CN | 109337869 A |   | 2/2019 |
| CN | 111117959 A | * | 5/2020 |

OTHER PUBLICATIONS

Zoll B, Lefterova P, Csipai M, et al. Generation of cytokine-induced killer cells using exogenous interleukin-2,-7 or-12. Cancer Immunol Immunother. 1998;47(4):221-226. doi: 10.1007/s002620050524 (Year: 1998).*

* cited by examiner

*Primary Examiner* — Teresa E Knight
*Assistant Examiner* — Kodye Lee Abbott
(74) *Attorney, Agent, or Firm* — MUNCY, GEISSLER, OLDS & LOWE, P.C.

(57) ABSTRACT

The present invention discloses a staged culture method for in-vitro expansion of human CIK cells and use thereof. In order to solve the problem of increase of a proportion of necrotic cells in CIK cells caused by adding exogenous IL-12 in the prior art, time of IL-12 induction is shortened by twice induction in stages. A primary induction culture medium containing IL-2, IL-7 and the IL-12 is used for primary induction and a re-induction culture medium containing the IL-2, the IL-7 and a CD28 antibody is used for re-induction. The result shows that the proportion of the necrotic cells in the CIK cells obtained by the staged twice induction method is obviously lower than that obtained by a continuous induction culture method commonly used in the prior art. Besides, a necrosis rate is influenced by primary induction time. When the primary induction time is 60 h, the necrosis rate is 1.02% at the lowest, which is reduced by 69.7% compared with that of a control group. The CIK cells obtained by the present application have a low necrosis rate and high activity, and can be widely used in the treatment of tumors.

7 Claims, No Drawings

STAGED CULTURE METHOD FOR IN-VITRO EXPANSION OF HUMAN CYTOKINE-INDUCED KILLER (CIK) AND USE THEREOF

TECHNICAL FIELD

The present invention relates to the technical field of cell culture and specifically, relates to a staged culture method for in-vitro expansion of human CIK cells and use thereof.

BACKGROUND

Cytokine-induced killer (CIK) cells are novel immuno-competent cells, have strong proliferation capacity and strong cytotoxic effect, and have certain immunological characteristics. Since the cells express two membrane protein molecules of CD3 and CD56 simultaneously, the cells are also called natural killer (NK) cell-like T lymphocytes and have the advantages of strong antitumor activity of T lymphocytes and non-MHC restriction tumor-killing of the NK cells. The cells have strong recognition ability to tumor cells, like "cellular missiles", can "shoot" tumor cells, but do not hurt "innocent" normal cells. Particularly, for patients after operation or radiotherapy and chemotherapy, the CIK cells can eliminate residual tiny metastatic focus, prevent cancer cells from spreading and recrudescence, and improve the immunity of the organism. Therefore, the CIK cells are considered as a new generation of scheme for adoptive cellular immunotherapy of tumors.

In-vitro expansion of the CIK cells requires the assistance of exogenous cytokines, such as IL-2, IL-7, IL-12, etc., which control the expansion and biological activities of various antigen-specific cells in the human immune system. The exogenous IL-2, IL-7 and IL-12 can remarkably promote the growth of lymphocytes. Particularly, the proliferation rate of the CIK cells is high under the presence of the IL-2 and IL-7. Besides, the exogenous IL-2, IL-7 and IL-12 have no influence on the cytotoxic activity of the CIK cells. Marten A et al found in the study that blockade of IL-12 uptake attenuates the cytotoxic activity of the CIK cells. Exogenous IL-2 and IL-7 stimulation can reduce the expression amount of corresponding receptors on the surfaces of the CIK cells, while the CD28 molecule is more highly expressed in the presence of the IL-7 than in the presence of the IL-2. The IL-12 reduces the expression of ICAM-1 on the surfaces of the CIK cells and the IL-7 increases the expression of CD56. The IL-7 significantly increases a proportion of CD4+ cells compared to the IL-2. Anti-CD3McAb plays an important role in the CIK cell culture process and also has a promoting effect on improving the killing sensitivity of the CIK cells to leukemia and lymphoma. Pre-incubation of the anti-CD3McAb with target cells together by Lefterov increases the killing sensitivity of the CIK cells. Besides, the enhanced effect can be partially blocked by anti-FcR antibodies (e.g. anti-CD36 and anti-CD32), indirectly demonstrating that the increased killing activity induced by the anti-CD3McAb is associated with FcR-mediated antibody binding. Therefore, when D-CIK cells are used in the treatment of patients with malignant tumors, they are beneficial to relieving the immune incapacity of T cells in the body of the patients with tumors, thereby improving the antitumor activity.

Although a small amount of apoptotic cells can appear in the culture process of the exogenous IL-2, IL-7 and IL-12, researches show that the addition of the exogenous IL-12 can increase a proportion of necrotic cells in the CIK cells, thereby influencing the effect of the CIK cells in the subsequent tumor treatment.

SUMMARY

In order to solve the technical problems existing in the prior art, on the basis of in-vitro expansion culture scheme for inducing CIK cells by using exogenous IL-2, IL-7, IL-12 and a CD28 antibody, by selectively adding cytokines in stages, the present invention provides a new method for in-vitro expansion of human CIK cells and use thereof, and solves the technical problem of an increase of a proportion of necrotic cells in the CIK cells caused by adding exogenous IL-12 in the prior art.

Specifically, the present application provides a staged culture method for in-vitro expansion of human CIK cells, including the following steps:
1) collecting peripheral venous blood;
2) separating peripheral blood mononuclear cells (PBMCs);
3) primary induction: inoculating the separated PBMCs into a primary induction culture medium containing IL-2, IL-7 and IL-12 for culture, wherein the concentration of IL-2 is 900 U/mL-1,200 U/mL, the concentration of IL-7 is 500 U/mL-800 U/mL, and the concentration of IL-12 is 600 U/mL-900 U/mL;
4) re-induction: culturing the cells by using a re-induction culture medium containing the IL-2, the IL-7 and a CD28 antibody, wherein the concentration of the IL-2 is 900 U/mL-1,200 U/mL, the concentration of the IL-7 is 500 U/mL-800 U/mL, and the concentration of the CD28 antibody is 1.5 µg/mL-3.0 µg/mL; and
5) harvesting the CIK cells.

Preferably, in step 2), polysucrose-diatrizoate meglumine is used as a layering liquid to separate the mononuclear cells.

Preferably, in step 3), the culture time of the primary induction is 60 h.

Preferably, in step 4), the culture time of the re-induction is 15 d, the culture medium is changed every other 3 d, and the replaced new culture medium is the re-induction culture medium.

Preferably, in step 3), the concentration of the IL-2 is 900 U/mL-1,000 U/mL, the concentration of the IL-7 is 700 U/mL-800 U/mL, and the concentration of the IL-12 is 700 U/mL-800 U/mL.

Preferably, in step 4), the concentration of the IL-2 is 900 U/mL-1,000 U/mL, the concentration of the IL-7 is 700 U/mL-800 U/mL, and the concentration of the CD28 is 1.5 µg/mL-2.0 µg/mL.

Preferably, serum at a volume fraction of 10% is further added to the primary induction culture medium and the re-induction culture medium.

Preferably, IFN-γ is further added into the primary induction culture medium and the concentration of the IFN-γ is 300 U/mL-400 U/mL.

Preferably, a step of counting the harvested CIK cells is further included.

The present application further provides use of the staged culture method for in-vitro expansion of human CIK cells in preparation of the CIK cells.

Compared with the prior art, the present invention has the following beneficial effects:

Through twice induction in stages, the present application shortens time of IL-12 induction and avoids an increase of a proportion of necrotic cells caused by long-term contact of the IL-12. The result shows that the proportion of the necrotic cells in the CIK cells obtained by the staged twice induction method of the present application is obviously lower than that obtained by a continuous induction culture method commonly used in the prior art. Besides, a necrosis rate is influenced by primary induction time. When the primary induction time is 60 h, the necrosis rate is 1.02% at the lowest, which is reduced by 69.7% compared with that of a control group. The CIK cells obtained by the present application have a low necrosis rate and high activity, and can be widely used in the treatment of tumors.

DETAILED DESCRIPTION

The following contents describe implementations of the present invention through specific embodiments, and those skilled in the art can easily understand other advantages and effects of the present invention from the contents disclosed in the description. The present invention can further be implemented or applied through other different embodiments. On the basis of different viewpoints and applications, various modifications or amendments can be made to various details of the description without departing from the spirit of the present invention. It should be noted that without conflict, the following examples and features in the examples may be combined with each other.

Example 1

1) Collecting Peripheral Venous Blood
2) Separating Peripheral Blood Mononuclear Cells (PBMCs)

2 ml of venous blood was taken, injected into a sterile test tube containing 0.2 ml of a heparin solution, and shaken evenly for white blood cell counting and differential counting. Then an equal amount of a Hank's solution was added and mixed evenly. 2 ml of a polysucrose-diatrizoate meglumine layering liquid was taken and placed in a centrifuge tube. The diluted blood was slowly added on the layering liquid slowly along the tube wall to form a clear interface. A volume ratio of the diluted blood to the layering liquid was appropriately 2:1 to 3:1. The mixture was placed in a horizontal centrifuge and centrifuged at 2,000 r/min for 20 min. After the centrifugation, the mixture was divided into four layers from the bottom of the centrifuge tube to the liquid level, successively a red blood cell and granulocyte layer, a layering liquid layer, a mononuclear cell layer and a plasma layer (containing platelets and broken cells). The mononuclear cell layer was directly sucked out by a dropper, or the layer was sucked out after the plasma layer was sucked out and then was placed in another centrifuge tube. The Hank's solution at the volume of 4 times or more was added and fully and evenly mixed. The mixture was centrifuged at 1,000 r/min for 10 min. After the centrifugation, the supernatant was discarded. The residue was washed 2 times with the Hank's solution. The Hank's solution or culture solution containing 10%-20% inactivated calf serum was used for preparing a cell suspension. The cells were counted, the cell activity was detected with trypan blue at the same time, and finally, the cell suspension was regulated to a proper concentration according to experimental requirements.

3) Primary Induction

The separated PBMCs were inoculated into a cell culture flask containing 15 ml of a primary induction culture medium and placed in a 37° C. and 5% $CO_2$ incubator for culture for 60 h.

Primary induction culture medium: GT-T581 culture medium containing 900 U/mL of IL-2, 500 U/mL of IL-7, 600 U/mL of IL-12, 300 U/mL of IFN-γ, and serum at a volume fraction of 10%.

4) Re-Induction

The original culture medium in the cell culture flask was discarded and the cells were rinsed 2 times with the Hank's solution. A re-induction culture medium was added and the cells were cultured in the 37° C. and 5% $CO_2$ incubator for 15 d. The culture medium was changed once every other 3 d. During the change of the culture medium, a new culture medium was used for rinsing for 1-2 times. The changed culture medium was still the re-induction culture medium.

The re-induction culture medium: GT-T581 culture medium containing 900 U/mL of IL-2, 500 U/mL of IL-7, 1.5 μg/mL of a CD28 antibody, and serum at a volume fraction of 10%.

5) CIK Cells were Harvested by Trypsin Digestion.

Example 2

1) Collecting Peripheral Venous Blood
2) Separating Peripheral Blood Mononuclear Cells (PBMCs)

2 ml of venous blood was taken, injected into a sterile test tube containing 0.2 ml of a heparin solution, and shaken evenly for white blood cell counting and differential counting. Then an equal amount of a Hank's solution was added and mixed evenly. 2 ml of a polysucrose-diatrizoate meglumine layering liquid was taken and placed in a centrifuge tube. The diluted blood was slowly added on the layering liquid slowly along the tube wall to form a clear interface. A volume ratio of the diluted blood to the layering liquid was appropriately 2:1 to 3:1. The mixture was placed in a horizontal centrifuge and centrifuged at 2,000 r/min for 20 min. After the centrifugation, the mixture was divided into four layers from the bottom of the centrifuge tube to the liquid level, successively a red blood cell and granulocyte layer, a layering liquid layer, a mononuclear cell layer and a plasma layer (containing platelets and broken cells). The mononuclear cell layer was directly sucked out by a dropper, or the layer was sucked out after the plasma layer was sucked out and then was placed in another centrifuge tube. The Hank's solution at the volume of 4 times or more was added and fully and evenly mixed. The mixture was centrifuged at 1,000 r/min for 10 min. After the centrifugation, the supernatant was discarded. The residue was washed 2 times with the Hank's solution. The Hank's solution or culture solution containing 10%-20% inactivated calf serum was used for preparing a cell suspension. The cells were counted, the cell activity was detected with trypan blue at the same time, and finally, the cell suspension was regulated to a proper concentration according to experimental requirements.

3) Primary Induction

The separated PBMCs were inoculated into a cell culture flask containing 15 ml of a primary induction culture medium and placed in a 37° C. and 5% $CO_2$ incubator for culture for 60 h.

Primary induction culture medium: GT-T581 culture medium containing 1,200 U/mL of IL-2, 800 U/mL of IL-7, 900 U/mL of IL-12, 400 U/mL of IFN-γ, and serum at a volume fraction of 10%.

4) Re-Induction

The original culture medium in the cell culture flask was discarded and the cells were rinsed 2 times with the Hank's solution. A re-induction culture medium was added and the cells were cultured in the 37° C. and 5% $CO_2$ incubator for 15 d. The culture medium was changed once every other 3 d. During the change of the culture medium, a new culture medium was used for rinsing for 1-2 times. The changed culture medium was still the re-induction culture medium.

The re-induction culture medium: GT-T581 culture medium containing 1,200 U/mL of IL-2, 800 U/mL of IL-7, 3.0 μg/mL of a CD28 antibody, and serum at a volume fraction of 10%. 5) CIK cells were harvested by trypsin digestion.

Example 3

1) Collecting Peripheral Venous Blood
2) Separating Peripheral Blood Mononuclear Cells (PBMCs)

2 ml of venous blood was taken, injected into a sterile test tube containing 0.2 ml of a heparin solution, and shaken evenly for white blood cell counting and differential counting. Then an equal amount of a Hank's solution was added and mixed evenly. 2 ml of a polysucrose-diatrizoate meglumine layering liquid was taken and placed in a centrifuge tube. The diluted blood was slowly added on the layering liquid slowly along the tube wall to form a clear interface. A volume ratio of the diluted blood to the layering liquid was appropriately 2:1 to 3:1. The mixture was placed in a horizontal centrifuge and centrifuged at 2,000 r/min for 20 min. After the centrifugation, the mixture was divided into four layers from the bottom of the centrifuge tube to the liquid level, successively a red blood cell and granulocyte layer, a layering liquid layer, a mononuclear cell layer and a plasma layer (containing platelets and broken cells). The mononuclear cell layer was directly sucked out by a dropper, or the layer was sucked out after the plasma layer was sucked out and then was placed in another centrifuge tube. The Hank's solution at the volume of 4 times or more was added and fully and evenly mixed. The mixture was centrifuged at 1,000 r/min for 10 min. After the centrifugation, the supernatant was discarded. The residue was washed 2 times with the Hank's solution. The Hank's solution or culture solution containing 10%-20% inactivated calf serum was used for preparing a cell suspension. The cells were counted, the cell activity was detected with trypan blue at the same time, and finally, the cell suspension was regulated to a proper concentration according to experimental requirements.

3) Induction Culture

The separated PBMCs were inoculated into a cell culture flask containing 15 ml of an induction culture medium and placed in a 37° C. and 5% $CO_2$ incubator for culture for 18 d. The culture medium was changed once every other 3 d. During the change of the culture medium, a new culture medium was used for rinsing for 1-2 times.

Induction culture medium: GT-T581 culture medium containing 900 U/mL of IL-2, 500 U/mL of IL-7, 600 U/mL of IL-12, 1.5 μg/mL of a CD28 antibody, 300 U/mL of IFN-γ, and serum at a volume fraction of 10%.

4) CIK Cells were Harvested by Trypsin Digestion.

Example 4

1) Collecting Peripheral Venous Blood
2) Separating Peripheral Blood Mononuclear Cells (PBMCs)

2 ml of venous blood was taken, injected into a sterile test tube containing 0.2 ml of a heparin solution, and shaken evenly for white blood cell counting and differential counting. Then an equal amount of a Hank's solution was added and mixed evenly. 2 ml of a polysucrose-diatrizoate meglumine layering liquid was taken and placed in a centrifuge tube. The diluted blood was slowly added on the layering liquid slowly along the tube wall to form a clear interface. A volume ratio of the diluted blood to the layering liquid was appropriately 2:1 to 3:1. The mixture was placed in a horizontal centrifuge and centrifuged at 2,000 r/min for 20 min. After the centrifugation, the mixture was divided into four layers from the bottom of the centrifuge tube to the liquid level, successively a red blood cell and granulocyte layer, a layering liquid layer, a mononuclear cell layer and a plasma layer (containing platelets and broken cells). The mononuclear cell layer was directly sucked out by a dropper, or the layer was sucked out after the plasma layer was sucked out and then was placed in another centrifuge tube. The Hank's solution at the volume of 4 times or more was added and fully and evenly mixed. The mixture was centrifuged at 1,000 r/min for 10 min. After the centrifugation, the supernatant was discarded. The residue was washed 2 times with the Hank's solution. The Hank's solution or culture solution containing 10%-20% inactivated calf serum was used for preparing a cell suspension. The cells were counted, the cell activity was detected with trypan blue at the same time, and finally, the cell suspension was regulated to a proper concentration according to experimental requirements.

3) Induction Culture

The separated PBMCs were inoculated into a cell culture flask containing 15 ml of an induction culture medium and placed in a 37° C. and 5% $CO_2$ incubator for culture for 18 h. The culture medium was changed once every other 3 d. During the change of the culture medium, a new culture medium was used for rinsing for 1-2 times.

Induction culture medium: GT-T581 culture medium containing 900 U/mL of IL-2, 500 U/mL of IL-7, 1.5 μg/mL of a CD28 antibody, 300 U/mL of IFN-γ, and serum at a volume fraction of 10%.

4) CIK Cells were Harvested by Trypsin Digestion.

Example 5

Propidium iodide (PI) can permeate membranes of necrotic cells to stain the necrotic cells red and distinguish the necrotic cells from normal cells. Hoechst33258 can penetrate membranes of the normal cells and bind to chromosomes to show the normal cells and apoptotic cells. The staining of the apoptotic cells is enhanced and brightened, and nuclear chromatin condensation, migration and fragmentation appeared.

Polylysine was coated on a sterilized cover glass, air-dried and placed into a 24-well plate. The cells were counted and inoculated in the 24-well plate with 50,000 cells per well. After 24 h of the inoculation, the cells were washed twice with sugar-free balanced salt, the PI and Hoechst 33258 (prepared with a sugar-free balanced salt solution to 0.01 mg/ml, i.e., diluted 100 times) were added, and the cells were subjected to warm bath in the dark for 10 min. After the cells were washed twice with a sugar-free balanced salt buffer, the cells were fixed with 4% paraformaldehyde for 10 min. The paraformaldehyde was washed by using the sugar-free balanced salt buffer, the cover glass was clamped and put on a glass slide, and observing and shooting were performed by using a fluorescence microscope. PI fluorescence is red (620 nm) in four quadrants of the glass slide and three fields of view (at 200×) are photographed randomly with a total of 12 fields of view. The total number of the cells, the number of the necrotic cells, and the number of the apoptotic cells in the 12 fields of view were counted as one sample.

For the CIK cells harvested in examples 1-4, the number of the necrotic cells and the number of the apoptotic cells were counted by using the method, and a necrosis rate and an apoptosis rate were calculated.

Necrosis rate=number of necrotic cells/total number of cells×100%; and apoptosis rate=number of apoptotic cells/total number of cells×100%.

The result is shown in Table 1. The lowest necrosis rate of the CIK cells obtained by the staged twice induction method can reach 1.02%, which is obviously lower than that obtained by the continuous induction method in example 3, and the necrosis rate is reduced by 69.7%. The lowest apoptosis rate of the CIK cells obtained by the staged twice induction method can reach 1.53%, which is slightly lower than that obtained by the continuous induction method in example 3, and the apoptosis rate is reduced by 16.8%. The result indicates that the staged twice induction method can effectively avoid an increase of the necrosis rate caused by long-time induction of the IL-12.

In example 4 without the IL-12 induction, although the necrosis rate is comparable to that of the staged twice induction method, the number of the obtained CIK cells is one order of magnitude lower, indicating that the IL-12 plays an important role in an in-vitro expansion of the CIK cells.

TABLE 1

Total number, necrosis rate and apoptosis rate of CIK cells obtained by different induction methods

| Groups | Example 1 | Example 2 | Example 3 | Example 4 |
|---|---|---|---|---|
| Total number of CIK cells | $1.32 \times 10^9$ | $1.37 \times 10^9$ | $1.40 \times 10^9$ | $0.65 \times 10^9$ |
| Necrosis rate | 1.02% | 1.21% | 3.37% | 1.28% |
| Apoptosis rate | 1.76% | 1.53% | 1.84% | 1.63% |

Example 6

To investigate the effect of the primary induction time (i.e., the acting time of the IL-2) on the necrosis rate of the CIK cells, the primary induction time was set to 24 h, 36 h, 48 h, 60 h and 72 h. The other steps were the same as those in example 1. The cell counting method is shown in example 5 and the result is as follows.

TABLE 2

Effect of primary induction time on necrosis rate and apoptosis rate of CIK cells

| Groups | 24 h | 36 h | 48 h | 60 h | 72 h |
|---|---|---|---|---|---|
| Total number of CIK cells | $0.37 \times 10^9$ | $0.46 \times 10^9$ | $1.02 \times 10^9$ | $1.23 \times 10^9$ | $1.39 \times 10^9$ |
| Necrosis rate | 1.09% | 1.11% | 1.23% | 1.22% | 1.67% |
| Apoptosis rate | 1.52% | 1.48% | 1.55% | 1.49% | 1.53% |

The influence of the acting time of the IL-2 on the total number and the necrosis rate of the CIK cells is larger. The total number and the necrosis rate of the CIK cells are gradually increased along with the increase of the primary induction time (namely the acting time of the IL-2). By combining the effects of the two aspects. 60 h is determined as the optimal primary induction time.

The foregoing examples only used to illustrate the technical solutions of the present invention, and are not intended to limit same. Although the present invention is described in detail with reference to the foregoing examples, a person of ordinary skill in the art should understand that they can still modify the technical solutions described in the foregoing examples, or make equivalent substitutions to some technical features therein. These modifications or substitutions do not make the essence of the corresponding technical solutions depart from the spirit and scope of the technical solutions of the examples of the present invention.

What is claimed is:

1. A method for in-vitro expansion of human cytokine-induced killer (CIK) cells, comprising the following staged steps:
    1) collecting peripheral venous blood;
    2) separating peripheral blood mononuclear cells (PBMCs) from peripheral venous blood;
    3) inducing CIKs from PBMCs by two stages of induction comprising a primary induction comprising culturing the separated PBMCs in a primary induction culture medium containing IL-2, IL-7 and IL-12 for 60 hours, wherein the concentration of IL-2 is 900 U/mL-1,200 U/mL, the concentration of IL-7 is 500 U/mL-800 U/mL, and the concentration of IL-12 is 600 U/mL-900 U/mL;
    4) a secondary induction comprising replacing the primary induction culture medium with a secondary primary induction medium containing IL-2, IL-7 and a CD28 antibody, and culturing the PBMCs in the secondary primary induction medium for 15 days with medium changes every 72±2 hours, wherein the concentration of IL-2 is 900 U/mL-1,200 U/mL, the concentration of IL-7 is 500 U/mL-800 U/mL, and the concentration of the CD28 antibody is 1.5 ug/mL-3.0 ug/mL; and
    5) harvesting the CIK cells.

2. The method for in-vitro expansion of human CIK cells according to claim 1, wherein step 2), further comprising using polysucrose-diatrizoate meglumine as a layering liquid to separate the PBMCs.

3. The method for in-vitro expansion of human CIK cells according to claim 1, wherein in step 3), the concentration of the IL-2 is 900 U/mL-1,000 U/mL, the concentration of the IL-7 is 700 U/mL-800 U/mL, and the concentration of the IL-12 is 700 U/mL-800 U/mL.

4. The method for in-vitro expansion of human CIK cells according to claim 1, wherein the CIK cells exhibit a necrosis rate ≤1.5% and a total cell count ≥$1.3 \times 10^9$.

5. The method for in-vitro expansion of human CIK cells according to claim 1, wherein serum at a volume fraction of 10% is further added to the primary induction culture medium and the re-induction culture medium.

6. The method for in-vitro expansion of human CIK cells according to claim 1, wherein IFN-γ is further added into the primary induction culture medium and the concentration of the IFN-γ is 300 U/mL-400 U/mL.

7. The method for in-vitro expansion of human CIK cells according to claim 1, further comprising a step of counting the harvested CIK cells.

* * * * *